United States Patent

Hottovy et al.

[11] Patent Number: 6,114,501
[45] Date of Patent: Sep. 5, 2000

[54] DILUENT RECYCLE PROCESS

[75] Inventors: John D. Hottovy; Bruce E. Kreischer, both of Bartlesville, Okla.

[73] Assignee: Philips Petroleum Company, Bartlesville, Okla.

[21] Appl. No.: 08/994,743

[22] Filed: Dec. 19, 1997

[51] Int. Cl.[7] ................................................. C08F 6/10
[52] U.S. Cl. ........................... 528/501; 526/70; 210/806
[58] Field of Search ............................ 526/70; 528/501; 210/806

[56] References Cited

U.S. PATENT DOCUMENTS

| | | |
|---|---|---|
| 3,081,290 | 3/1963 | Cottle . |
| 3,658,780 | 4/1972 | Scoggin . |
| 4,424,341 | 1/1984 | Hanson et al. ........................... 528/501 |
| 4,501,885 | 2/1985 | Sherk et al. ............................. 528/501 |
| 4,613,484 | 9/1986 | Ayres et al. ............................. 422/132 |
| 4,737,280 | 4/1988 | Hanson .................................... 210/181 |
| 5,533,437 | 7/1996 | Howard et al. ............................. 95/42 |
| 5,597,892 | 1/1997 | Hanson .................................... 528/501 |

*Primary Examiner*—David J. Buttner
*Attorney, Agent, or Firm*—Polly C. Owen

[57] ABSTRACT

A process to recycle diluent while capturing such other compounds is provided.

19 Claims, 4 Drawing Sheets

Bubble Point Pressure vs Temperature

6,114,501

DILUENT RECYCLE PROCESS

FIELD OF THE INVENTION

This invention is related to the field of processes that produce polymers that comprise ethylene where said processes use a diluent.

BACKGROUND OF THE INVENTION

Billions of pounds of polymers produced from ethylene, or produced from ethylene and one or more comonomers, are made each year. The production of these polymers is a highly competitive business. Producers of such polymers spend millions of dollars to research for ways to decrease the cost of production. This is because of the vast economics of scale possible in these processes. That is, even shaving a penny per pound off of the cost of production can save large sums of money. For example, if all producers of these polymers could shave a penny per pound off their costs, this would produce a savings of about 800,000,000 dollars.

One of the most used processes for producing these polymers is called the loop slurry process. This process produces, in part, a slurry that comprises polymer and diluent. Additionally, significant amounts of other compounds (hereafter "OC" or "OC's") are included in such slurry. Traditionally, the diluent is captured through a complicated process so that such diluent can be recycled to the reactor. However, this process is not entirely satisfactory. Consequently, it is desirable to have a more satisfactory diluent recycle process. Furthermore, it would be beneficial to have a diluent recycle process that can capture such OC's and that is less expensive to construct and/or operated. Therefore, the inventors provide this invention.

SUMMARY OF THE INVENTION

It is an object of this invention to provide a process to recycle diluent while capturing such OC's.

In accordance with this invention a process is provided. Said process comprises:

(1) producing a First Stream in a First Source Zone (not depicted);
(2) transporting said First Stream from said First Source Zone through a First Stream Zone (100) and to a First Separating Zone (110);
(3) separating, in said First Separating Zone, said First Stream into a Second Stream and a Third Stream;
(4) transporting said Second Stream from said First Separating Zone through a Second Stream Zone (120) and to an Eleventh Stream Zone (260);
(5) transporting said Third Stream from said First Separating Zone through a Third Stream Zone (130) and to a Second Separating Zone (140);
(6) separating, in said Second Separating Zone, said Third Stream into a Fourth Stream and a Fifth Stream;
(7) transporting said Fourth Stream from said Second Separating Zone through a Fourth Stream Zone (150) and to a First Pressurizing Zone (170);
(8) transporting said Fifth Stream from said Second Separating Zone through a Fifth Stream Zone (160) and to a First Collecting Zone (not depicted);
(9) pressurizing, in said First Pressurizing Zone, said Fourth Stream to produce a Sixth Stream;
(10) transporting said Sixth Stream from said First Pressurizing Zone through a Sixth Stream Zone (180) and to a First Cooling Zone (190);
(11) cooling, in said First Cooling Zone, said Sixth Stream to produce a Seventh Stream;
(12) transporting said Seventh Stream from said First Cooling Zone through a Seventh Stream Zone (200) and to a Third Separating Zone (210);
(13) separating, in said Third Separating Zone, said Seventh Stream into an Eighth Stream and a Ninth Stream;
(14) transporting said Eighth Stream from said Third Separating Zone through an Eighth Stream Zone (220) and to a Second Collecting Zone (not depicted);
(15) transporting said Ninth Stream from said Third Separating Zone through a Ninth Stream Zone (230) and to a Second Pressurizing Zone (240);
(16) pressurizing, in said Second Pressurizing Zone, said Ninth Stream to produce a Tenth Stream;
(17) transporting said Tenth Stream from said Second Pressurizing Zone through a Tenth Stream Zone and to an Eleventh Stream Zone;
(18) combining, in said Eleventh Stream Zone, said Second Stream and said Tenth Stream to produce an Eleventh Stream;
(19) transporting said Eleventh Stream though said Eleventh Stream Zone and to a Second Cooling Zone (270);
(20) cooling, in said Second Cooling Zone, said Eleventh Stream to produce a Twelfth Stream;
(21) transporting said Twelfth Stream from said Second Cooling Zone through a Twelfth Stream Zone (280) and to a Fourth Separating Zone (290);
(22) separating, in said Fourth Separating Zone, said Twelfth Stream into a Thirteenth Stream and a Fourteenth Stream;
(23) transporting said Fourteenth Stream from said Fourth Separating Zone through a Fourteenth Stream Zone (310) and to a Third Cooling Zone (320);
(24) transporting said Thirteenth Stream from said Fourth Separating Zone through a Thirteenth Stream Zone (300) and to a Third Collecting Zone (not depicted);
(25) cooling, in said Third Cooling Zone, said Fourteenth Stream to produce a Fifteenth Stream;
(26) transporting said Fifteenth Stream from said Third Cooling Zone through a Fifteenth Stream Zone (330) and to a Fifth Separating Zone (340);
(27) separating, in said Fifth Separating Zone, said Fifteenth Stream into a Sixteenth Stream and a Seventeenth Stream;
(28) transporting said Seventeenth Stream from said Fifth Separating Zone through a Seventeenth Stream Zone (360) and to a Fifth Collecting Zone (not depicted); and
(29) transporting said Sixteenth Stream from said Fifth Separating Zone through a Sixteenth Stream Zone (350) and to a Fourth Collecting Zone (not depicted).

Other objects of this invention will become more apparent with reference to the following.

DETAILED DESCRIPTION OF THE INVENTION

Figure 1:
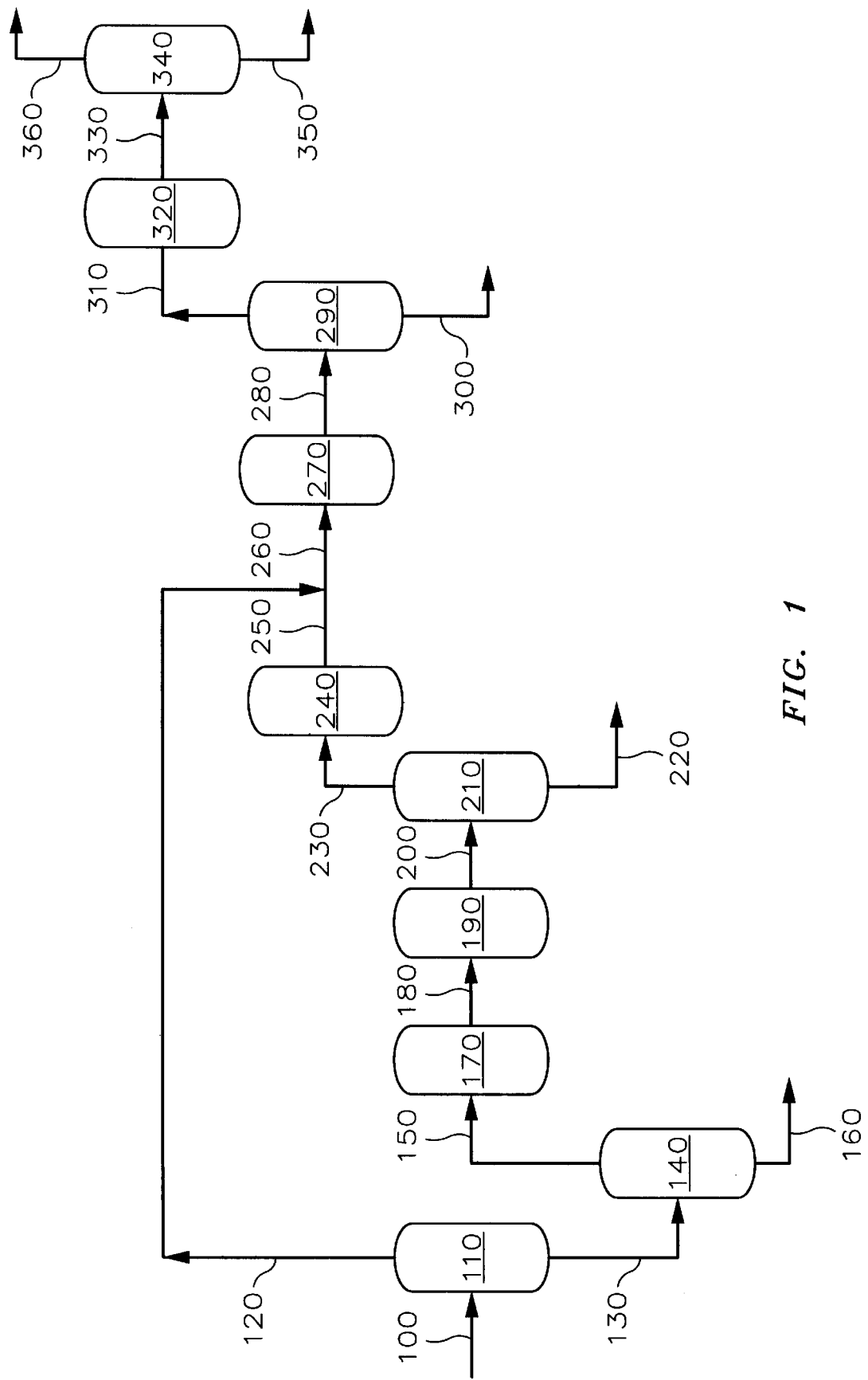
FIG. 1 discloses a representation of the invention.

This invention comprises the following steps.

Step (1) is producing said First Stream in said First Source Zone.

Said First Stream comprises polymer and diluent. Additionally, OC's such as, for example, ethylene, hydrocarbon compounds that have one to four carbon atoms excluding ethylene and isobutane (hereafter "C4–"), isobutane, hydrocarbon compounds that have five or more carbon atoms excluding 1-hexene (hereafter "C5+") and 1-hexene are present. Optionally, OC's such as nonhydrocarbon compounds with a molecular weight less than 60 grams per mole (hereafter "NH") can be present such as, for example, hydrogen, nitrogen, carbon dioxide, and oxygen.

The polymer is a homopolymer of ethylene, or a copolymer of ethylene and a comonomer. The majority of said copolymer, by weight, will be ethylene.

The diluent is a compound where said polymer is substantially, preferably entirely, insoluble. Suitable examples of diluent are isobutane, propane, and hexane. Currently, isobutane is preferred.

The temperature and pressure of said First Stream is such that the majority of said polymer is in the solid phase, while the majority of the rest of the compounds in said First Stream are in the non-solid phase or the non-solid phases.

When isobutane is used as a diluent the temperature of said First Stream should be in the range of about 100° F. to about 250° F. However, it is preferred to have the temperature in the range of about 130° F. to about 230° F. Additionally, it is most preferred to have the temperature in the range of 150 ° F. to 210° F.

When isobutane is used as a diluent the pressure of said First Stream should be in the range of about 100 Psia to about 1500 Psia. However, it is preferred to have the pressure in the range of about 125 Psia to about 275 Psia. Additionally, it is most preferred to have the pressure in the range from 150 Psia to 250 Psia.

The First Source Zone is the zone where said First Stream is produced using slurry polymerization conditions. In particular, said First Source Zone uses a loop reactor to produce said First Stream. Said First Stream comprises solid, liquid, and vapor phases.

In general, said First Stream has an amount of ethylene from about 1 to about 20 weight percent based on the weight of the non-solid contents of the reactor. It is preferred when the amount of ethylene is from about 2 to about 12 weight percent, and it is most preferred when the amount of ethylene is from 3 to 6 weight percent.

Also, in general, said First Stream has an amount of 1-hexene, from 0 to about 20 weight percent based on the weight of the non-solid contents of the reactor. It is preferred when the amount of 1-hexene is from 0 to about 12 weight percent and it is most preferred when the amount of 1-hexene is from 0 to 3 weight percent.

Step (2) is transporting said First Stream from said First Source Zone through said First Stream Zone and to said First Separating Zone. This First Stream Zone connects, in fluid-flow communication, said First Source Zone with said First Separating Zone.

Step (3) is separating, in said First Separating Zone, said First Stream into said Second Stream and said Third Stream. An example of said First Separating Zone is a flash chamber. This separating can be accomplished by gravity.

Said Second Stream comprises a major part of the vapor phase of said First Stream. Some polymer fines from said First Stream may also be present.

Said Third Stream comprises a major part of the solid and liquid phases of said First Stream. Some vapor phase compounds may also be present.

When isobutane is the diluent, the temperature and pressures of said Second and Third Streams are in the same ranges as said temperatures and pressures of said First Stream.

Step (4) is transporting said Second Stream from said First Separating Zone through said Second Stream Zone and to an Eleventh Stream Zone. This Second Stream Zone connects, in fluid-flow communication, said First Separating Zone with said Eleventh Stream Zone.

Optionally, this Second Stream Zone can further comprise a First Filter Zone (not depicted) where said First Filter Zone filters any polymer fines from said Second Stream.

Alternatively, step (4) is transporting said Second Stream from said First Separating Zone through said Second Stream Zone and to said Second Cooling Zone. This Second Stream Zone connects, in fluid-flow communication, said First Separating Zone with said Second Cooling Zone.

Optionally, this Second Stream Zone can further comprise a First Filter Zone where said First Filter Zone filters any polymer fines from said Second Stream.

Optionally, an Oxygen Removal Zone can be placed before said Second Cooling Zone. This Oxygen Removal Zone removes at least a portion of any oxygen present in said Second Stream.

Step (5) is transporting said Third Stream from said First Separating Zone through said Third Stream Zone and to said Second Separating Zone. This Third Stream Zone connects, in fluid-flow communication, said First Separating Zone with said Second Separating Zone.

Step (6) is separating, in said Second Separating Zone, said Third Stream into said Fourth Stream and said Fifth Stream. An example of said Second Separating Zone is a flash chamber. This separating can be accomplished by gravity.

Said Fourth Stream comprises a major part of the vapor phase of said Third Stream. Some polymer fines from said Third Stream may also be present. Additionally, a major part of the liquid phase of said Third Stream is vaporized in said Second Separating Zone.

Said Fifth Stream comprises a major part of the solid phase of said Third Stream.

When isobutane is used as a diluent the temperature of said Fourth and Fifth Streams should be in the range of about 100° F. to about 250° F. However, it is preferred to have the temperature in the range of about 130° F. to about 230° F. Additionally, it is most preferred to have the temperature in the range of 150° F. to 210° F.

When isobutane is used as a diluent the pressure of said Fourth and Fifth Streams should be in the range of about 1 Psia to about 50 Psia. However, it is preferred to have the pressure in the range of about 5 Psia to about 40 Psia. Additionally, it is most preferred to have the pressure in the range from 10 Psia to 40 Psia.

Step (7) is transporting said Fourth Stream from said Second Separating Zone through said Fourth Stream Zone and to said First Pressurizing Zone. This Fourth Stream Zone connects, in fluid-flow communication, said Second Separating Zone with said First Pressurizing Zone.

Optionally, this Fourth Stream Zone can further comprise a Second Filter Zone (not depicted) where said Second Filter Zone filters any polymer fines from said Fourth Stream.

Step (8) is transporting said Fifth Stream from said Second Separating Zone through said Fifth Stream Zone and to said First Collecting Zone. This Fifth Stream Zone connects, in fluid-flow communication, said Second Separating Zone with said First Collecting Zone. This First Collecting Zone collects a major part of the polymer during this invention.

Step (9) is pressurizing, in said First Pressurizing Zone, said Fourth Stream to produce said Sixth Stream. An example of said First Pressurizing Zone is a compressor.

Step (10) is transporting said Sixth Stream from said First Pressurizing Zone through said Sixth Stream Zone and to said First Cooling Zone. This Sixth Stream Zone connects, in fluid-flow communication, said First Pressurizing Zone with said First Cooling Zone.

Step (11) is cooling, in said First Cooling Zone, said Sixth Stream to produce said Seventh Stream. An example of said First Cooling Zone is a heat exchanger.

Figure 2:
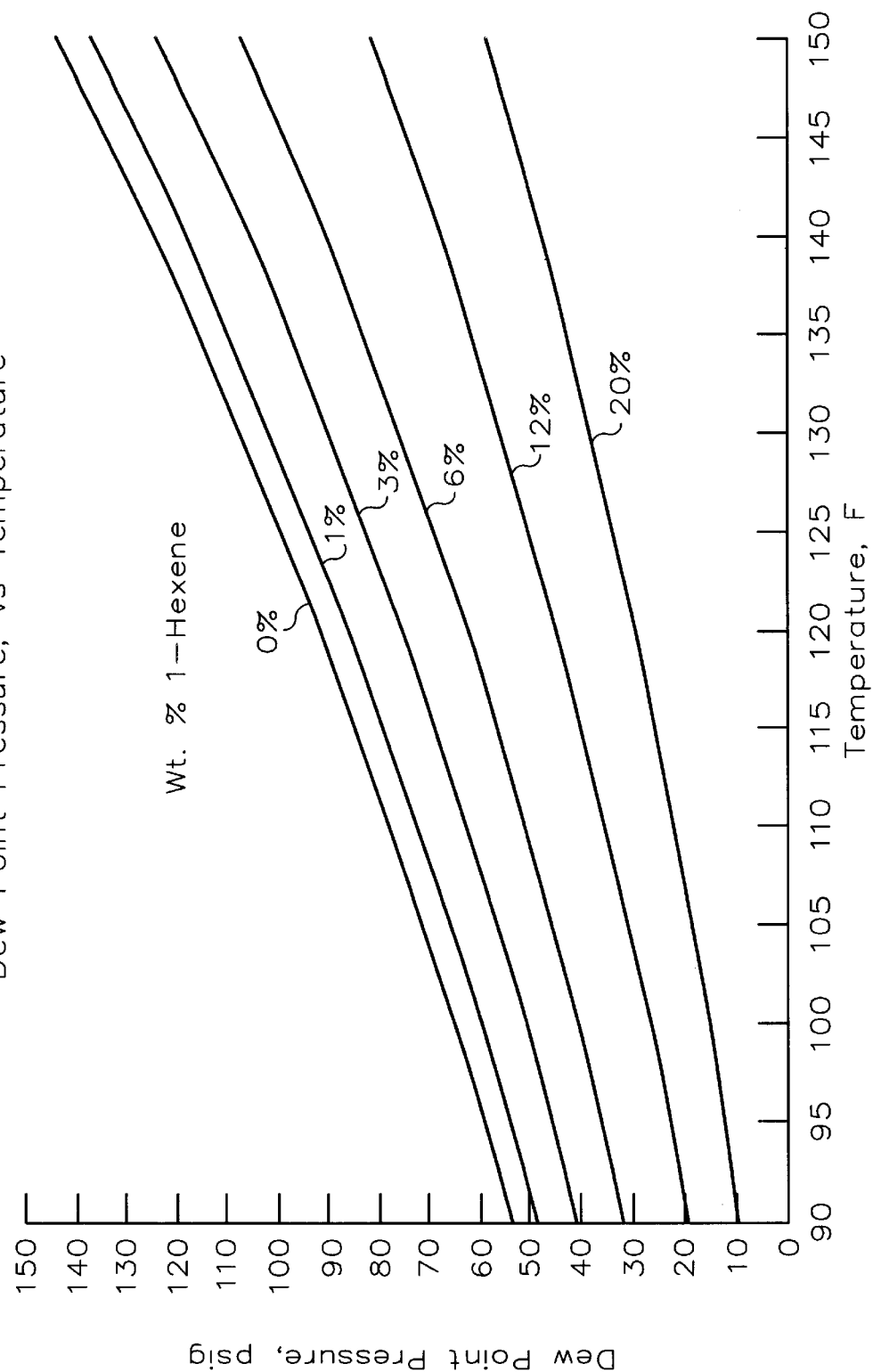
FIG. 2 discloses a pressure vs. temperature graph for the dew point of 1-hexene where said 1-hexene is in a mixture comprising ethylene and isobutane.

This First Pressurizing Zone and First Cooling Zone produces a liquid phase that comprises C5+ and 1-hexene. The temperature and pressure of said First Pressurizing Zone and First Cooling Zone produces a Seventh Stream that has a temperature and pressure above the dew point of 1-hexene. It should be noted that the proper temperature and pressure is affected by the amount of 1-hexene in said Fourth Stream. See, for example, FIG. 2. This liquid phase is about 0 to about 6 weight percent of said Seventh Stream, preferably it is about 0 to about 3 weight percent, and most preferably it is 0 to 1 weight percent.

When isobutane is used as a diluent the temperature of said Seventh Stream should be in the range of about 90° F. to about 150° F.

When isobutane is used as a diluent the pressure of said Seventh Stream should be in the range of about 10 Psia to about 150 Psia. However, it is preferred to have the pressure in the range of about 20 Psia to about 150 Psia. Additionally, it is most preferred to have the pressure in the range from 40 Psia to 150 Psia.

Step (12) is transporting said Seventh Stream from said First Cooling Zone through said Seventh Stream Zone and to said Third Separating Zone.

Step (13) is separating, in said Third Separating Zone, said Seventh Stream into an Eighth Stream and said Ninth Stream. An example of said Third Separating Zone is a flash tank. This separating can be accomplished by gravity.

When isobutane is the diluent, the temperature and pressures of said Eight and Ninth Streams are in the same ranges as said temperatures and pressures of said Seventh Stream.

Said Ninth Stream comprises a major part of the vapor phase of said Seventh Stream.

Said Eighth Stream comprises a major part of the liquid phase of said Seventh Stream.

Step (14) is transporting said Eighth Stream from said Third Separating Zone through an Eighth Stream Zone to said Second Collecting Zone. This Eighth Stream Zone connects, in fluid-flow communication, said Third Separating Zone with said Second Collecting Zone. This Second Collecting Zone collects OC's such as C5+ and 1-hexene.

Step (15) is transporting said Ninth Stream from said Third Separating Zone through said Ninth Stream Zone to said Second Pressuring Zone. This Ninth Stream Zone connects, in fluid-flow communication, said Third Separating Zone with said Second Pressurizing Zone.

Step (16) is pressurizing, in said Second Pressurizing Zone, said Ninth Stream to produce said Tenth Stream. An example of said Second Pressurizing Zone is a compressor.

Step (17) is transporting said Tenth Stream from said Second Pressurizing Zone through said Tenth Stream Zone and to said Eleventh Stream Zone. This Tenth Stream Zone connects, in fluid-flow communication, said Second Pressurizing Zone with said Eleventh Stream Zone.

Alternatively, this Tenth Stream Zone connects, in fluid-flow communication, said Second Pressurizing Zone with said Second Cooling Zone.

Optionally, an Oxygen Removal Zone can be placed before said Second Cooling Zone. This Oxygen Removal Zone removes at least a portion of any oxygen present in said Tenth Stream.

Step (18) is combining, in said Eleventh Stream Zone, said Second Stream and said Tenth Stream to produce an Eleventh Stream.

Step (19) is transporting said Eleventh Stream through said Eleventh Stream Zone to said Second Cooling Zone. This Eleventh Stream Zone connects, in fluid-flow communication, said Eleventh Stream Zone with said Second Cooling Zone.

Optionally, an Oxygen Removal Zone can be placed before said Second Cooling Zone. This Oxygen Removal Zone removes at least a portion of any oxygen present in said Eleventh Stream.

Step (20) is cooling, in said Second Cooling Zone, said Eleventh Stream to produce said Twelfth Stream. An example of said Second Cooling Zone is a heat exchanger.

Figure 3:
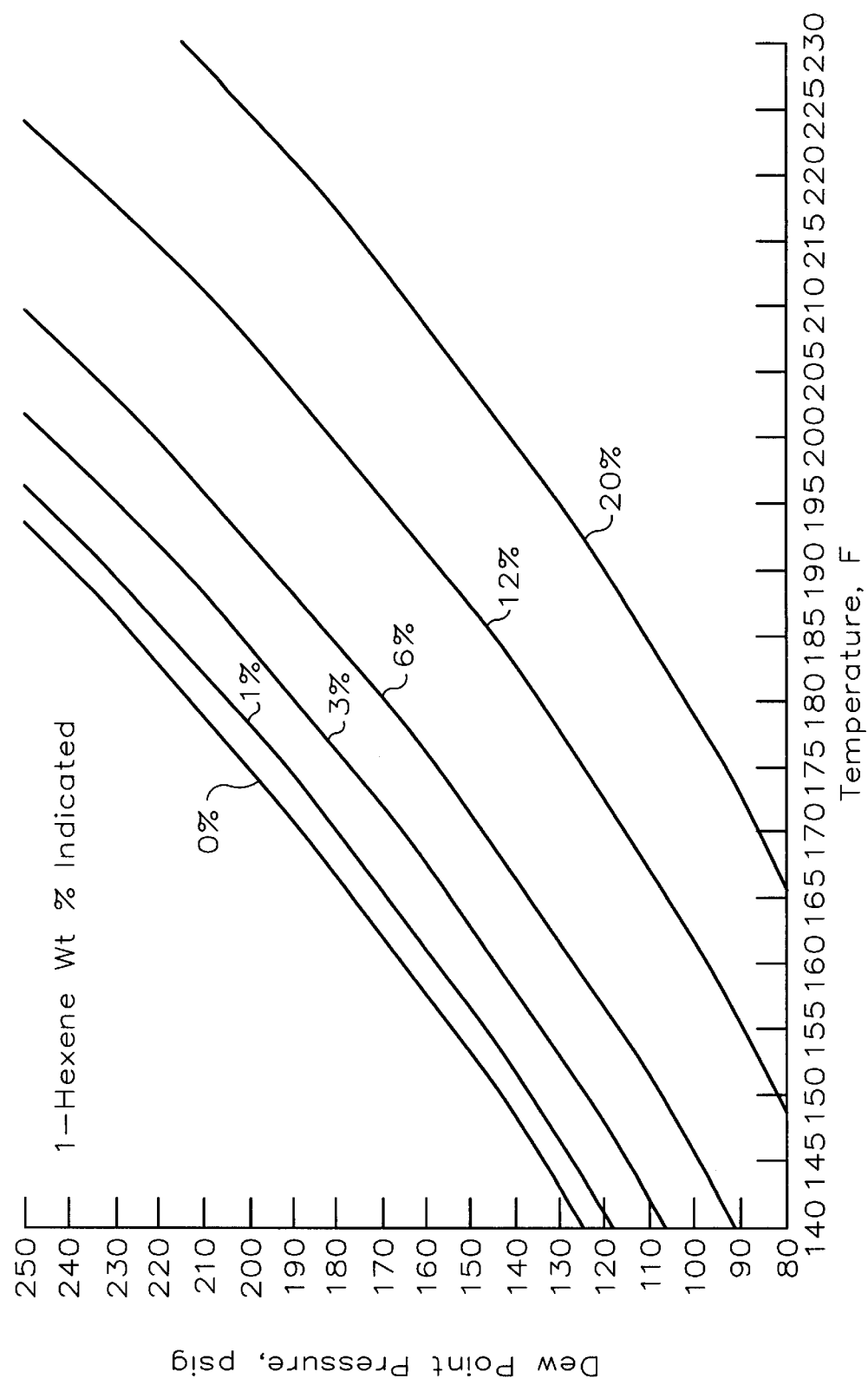
FIG. 3 discloses a pressure vs. temperature graph for the dew point of 1-hexene where said 1-hexene is in a mixture comprising ethylene and isobutane.

This Second Pressurizing Zone and Second Cooling Zone produces a liquid phase that comprises C5+ and 1-hexene. The temperature and pressure of said Second Pressurizing Zone and Second Cooling Zone produces a Twelfth Stream that has a temperature and pressure above the dew point of 1-hexene. It should be noted that the proper temperature and pressure is affected by the amount of 1-hexene in said Ninth Stream. See, for example, FIG. 3. This liquid phase is about 0 to about 6 weight percent of said Eleventh Stream, preferably it is about 0 to about 3 weight percent, and most preferably it is 0 to 1 weight percent.

The temperature of said Twelfth Stream should be in the range of about 140° F. to about 250° F. However, it is preferred to have the temperature in the range of about 150° F. to about 230° F. Additionally, it is most preferred to have the temperature in the range of 160° F. to 220° F.

The pressure of said Twelfth Stream should be in the range of about 10 Psia to about 300 Psia. However, it is preferred to have the pressure in the range of about 20 Psia to about 300 Psia. Additionally, it is most preferred to have the pressure in the range from 100 Psia to 250 Psia.

In general, the temperature of said Twelfth Stream is typically from about 1° F. to about 20° F. lower than the temperature of said Eleventh Stream.

Step (21) is transporting said Twelfth Stream from said Second Cooling Zone through said Twelfth Stream Zone and to said Fourth Separating Zone. This Twelfth Stream Zone connects, in fluid-flow communication, said Second Cooling Zone with said Fourth Separating Zone.

Step (22) is separating, is said Fourth Separating Zone, said Twelfth Stream into said Thirteenth Stream and said Fourteenth Stream. An example of said Third Separating Zone is a flash tank. This separating can be accomplished by gravity.

When isobutane is the diluent, the temperature and pressures of said Thirteenth and Fourteenth Streams are in the same ranges as said temperatures and pressures of said Twelfth Stream.

Said Fourteenth Stream comprises a major part of the vapor phase of said Twelfth Stream.

Said Thirteenth Stream comprises a major part of the liquid phase of said Twelfth Stream.

Step (24) is transporting said Thirteenth Stream from said Fourth Separating Zone through said Thirteenth Stream Zone and to said Third Collecting Zone. This Thirteenth Stream Zone connects, in fluid-flow communication, said Fourth Separating Zone with said Third Collecting Zone. This Third Collecting Zone collects OC's such as C5+ and 1-hexene. This Third Collecting Zone can be the same as said Second Collecting Zone.

Step (25) is cooling, in said Third Cooling Zone, said Fourteenth Stream to produce said Fifteenth Stream. An example of said Second Cooling Zone is a heat exchanger.

Figure 4:
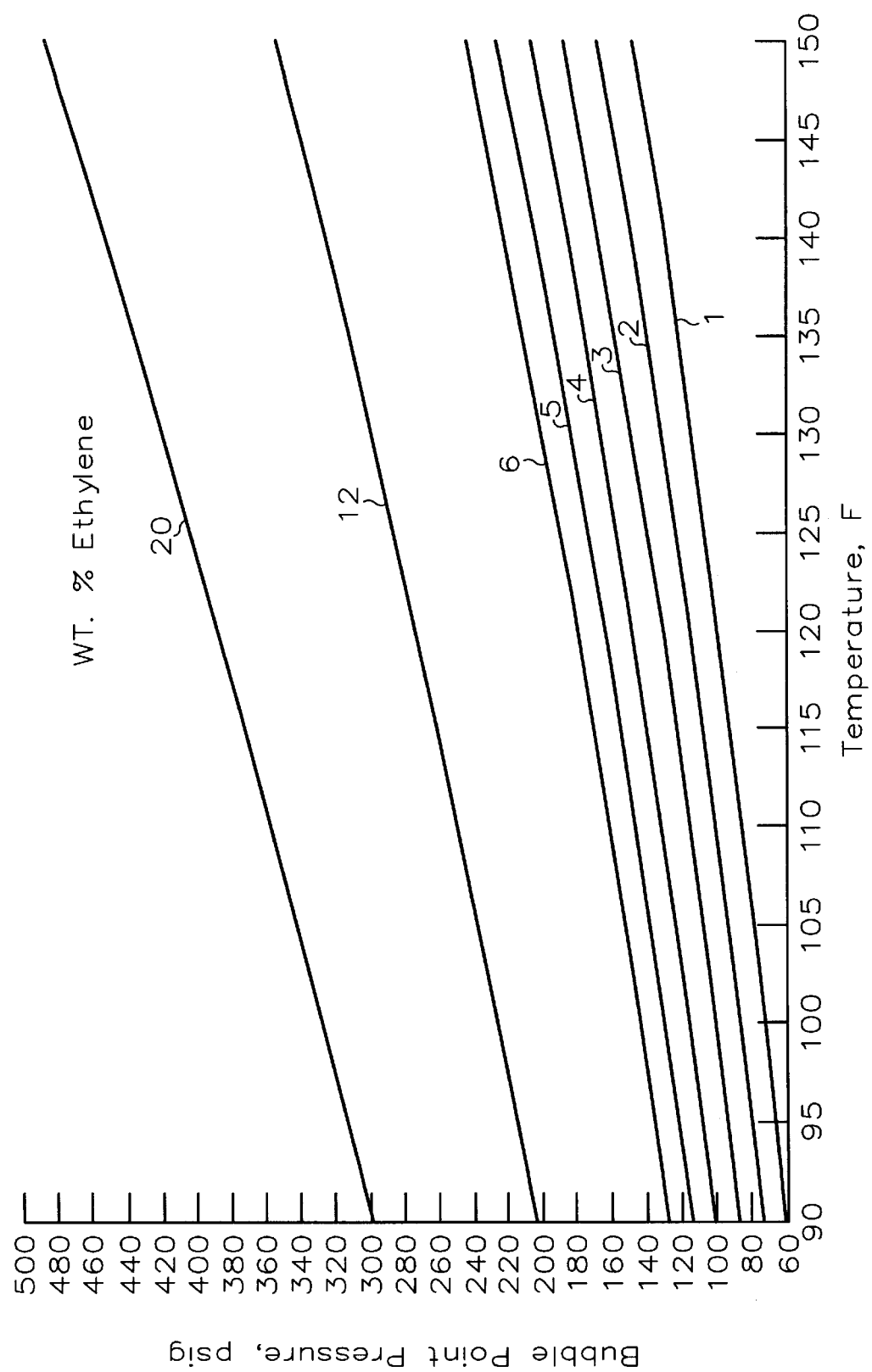
FIG. 4 discloses a pressure vs. temperature graph for the bubble point of ethylene where said ethylene is in a mixture comprising isobutane.

This Third Cooling Zone produces a vapor phase that comprises C4− and ethylene. The temperature and pressure of said Third Cooling Zone should be below the bubble point of ethylene. It should be noted that the proper temperature and pressure is affected by the amount of ethylene in said Fourteenth Stream. See, for example, FIG. 4. This vapor phase is about 0 to about 6 weight percent of said Fifteenth Stream, preferably it is about 0 to about 3 weight percent, and most preferably it is 0 to 1 weight percent.

The temperature of said Fifteenth Stream should be in the range of about 90° F. to about 150° F.

The pressure of said Fifteenth Stream should be in the range of about 60 Psia to about 500 Psia. However, it is preferred to have the pressure in the range of about 60 Psia to about 360 Psia. Additionally, it is most preferred to have the pressure in the range from 60 Psia to 250 Psia.

In general, it is preferred if the temperature of said Fifteenth Stream is from about 1° F. to about 60° F. lower than the temperature of said Fourteenth Stream.

Step (26) is transporting said Fifteenth Stream from said Third Cooling Zone through said Fifteenth Stream Zone and to said Fifth Separating Zone.

Step (27) is separating, in said Fifth Separating Zone, said Fifteenth Stream into said Sixteenth Stream and said Seventeenth Stream;

When isobutane is the diluent, the temperature and pressures of said Sixteenth and Seventeenth Streams are in the same ranges as said temperatures and pressures of said Fifteenth Stream.

Said Seventeenth Stream comprises a major part of the vapor phase of said Fifteenth Stream.

Said Sixteenth Stream comprises a major part of the liquid phase of said Fifteenth Stream.

Step (28) is transporting said Seventeenth Stream from said Fifth Separating Zone through said Seventeenth Stream Zone and to said Fifth Collecting Zone. This Fifth Collecting Zone collects a major portion of the vapor of said Fifteenth Stream. This Fifth Collecting Zone collects OC's such as C4− and ethylene.

Step (29) is transporting said Sixteenth Stream from said Fifth Separating Zone through said Sixteenth Stream Zone and to said Fourth Collecting Zone. This Fourth Collecting Zone collects said diluent.

That which is claimed is:

1. A process comprising:
   (1) producing a First Stream in a First Source Zone;
      wherein said First Stream comprises polymer, diluent, and other compounds;
      wherein said First Source Zone is a zone where said First Stream is produced using slurry polymerization conditions;
   (2) transporting said First Stream from said First Source Zone through a First Stream Zone and to a First Separating Zone;
   (3) separating, in said First Separating Zone, said First Stream into a Second Stream and a Third Stream;
      wherein said Second Stream comprises a major part of the vapor phase of said First Stream;
      wherein said Third Stream comprises a major part of the solid and liquid phases of said First Stream;
   (4) transporting said Second Stream from said First Separating Zone through a Second Stream Zone and to Second Cooling Zone;
   (5) transporting said Third Stream from said First Separating Zone through a Third Stream Zone and to a Second Separating Zone;
   (6) separating, in said Second Separating Zone, said Third Stream into a Fourth Stream and a Fifth Stream;
      wherein said Fourth Stream comprises a major part of the vapor phase of said Third Stream;
      wherein said Fifth Stream comprises a major part of the solid phase of said Third Stream;
   (8) transporting said Fifth Stream from said Second Separating Zone through a Fifth Stream Zone and to a First Collecting Zone;
   (20) cooling, in said Second Cooling Zone, said Second Stream to produce a Twelfth Stream;
   (21) transporting said Twelfth Stream from said Second Cooling Zone through a Twelfth Stream Zone and to a Fourth Separating Zone;
   (22) separating, in said Fourth Separating Zone, said Twelfth Stream into a Thirteenth Stream and a Fourteenth Stream;
      wherein said Thirteenth Stream comprises a major part of the liquid phase of said Twelfth Stream;
      wherein said Fourteenth Stream comprises a major part of the vapor phase of said Twelfth Stream;
   (23) transporting said Fourteenth Stream from said Fourth Separating Zone through a Fourteenth Stream Zone and to a Third Cooling Zone;
   (24) transporting said Thirteenth Stream from said Fourth Separating Zone through a Thirteenth Stream Zone and to a Third Collecting Zone;
   (25) cooling, in said Third Cooling Zone, said Fourteenth Stream to produce a Fifteenth Stream;
   (26) transporting said Fifteenth Stream from said Third Cooling Zone through a Fifteenth Stream Zone and to a Fifth Separating Zone;
   (27) separating, in said Fifth Separating Zone, said Fifteenth Stream into a Sixteenth Stream and a Seventeenth Stream;
      wherein said Sixteenth Stream comprises a major part of the liquid phase of said Fifteenth Stream;
      wherein said Seventeenth Stream comprises a major part of the vapor phase of said Fifteenth Stream;
   (28) transporting said Seventeenth Stream from said Fifth Separating Zone through a Seventeenth Stream Zone and to a Fifth Collecting Zone; and
   (29) transporting said Sixteenth Stream from said Fifth Separating Zone through a Sixteenth Stream Zone and to a Fourth Collecting Zone.

2. A process according to claim 1 wherein said other compounds are selected from the group consisting of ethylene, hydrocarbon compounds that have one to four carbon atoms excluding ethylene and isobutane, isobutane, hydrocarbon atoms that have five or more carbon atoms excluding 1-hexene, 1-hexene, and nonhydrocarbon compounds with a molecular weight less than 60 grams per mole.

3. A process according to claim 1 to prepare a diluent for recycle consisting essentially of Steps (1)–(8) and Steps (20)–(29).

4. A process according to claim 1 wherein said diluent is isobutane.

5. A process according to claim 4 wherein said other compounds of said First Stream comprises ethylene and 1-hexene, wherein said vapor of said Seventeenth Stream comprises said ethylene and wherein said liquid of said Thirteenth stream comprises said 1-hexene.

6. A process according to claim 5 wherein said liquid of said Sixteenth Stream comprises said isobutane diluent.

7. A process according to claim 6 comprising in addition subjecting at least one of said Second Stream, said Tenth Stream or said Eleventh Stream to an oxygen removal step.

8. A process comprising:
(1) producing a First Stream in a First Source Zone;
  wherein said First Stream comprises polymer, diluent, and other compounds and wherein said First Stream is further characterized by having solid, liquid, and vapor phases;
  wherein said First Source Zone is the a zone where said First Stream is produced using slurry polymerization conditions;
(2) transporting said First Stream from said First Source Zone through a First Stream Zone and to a First Separating Zone;
(3) separating, in said First Separating Zone, said First Stream into a Second Stream and a Third Stream;
  wherein said Second Stream comprises a major part of said vapor phase of said First Stream;
  wherein said Third Stream comprises a major part of said solid and liquid phases of said First Stream;
(4) transporting said Second Stream from said First Separating Zone through a Second Stream Zone and to an Eleventh Stream Zone;
(5) transporting said Third Stream from said First Separating Zone through a Third Stream Zone and to a Second Separating Zone;
(6) separating, in said Second Separating Zone, said Third Stream into a Fourth Stream and a Fifth Stream;
  wherein said Fourth Stream comprises a major part of a vapor phase separated from said Third Stream;
  wherein said Fifth Stream comprises a major part of said solid phase of said Third Stream;
(7) transporting said Fourth Stream from said Second Separating Zone through a Fourth Stream Zone and to a First Pressurizing Zone;
(8) transporting said Fifth Stream from said Second Separating Zone through a Fifth Stream Zone and to a First Collecting Zone;
(9) pressurizing, in said First Pressurizing Zone, said Fourth Stream to produce a Sixth Stream;
(10) transporting said Sixth Stream from said First Pressurizing Zone through a Sixth Stream Zone and to a First Cooling Zone;
(11) cooling, in said First Cooling Zone, said Sixth Stream to produce a Seventh Stream;
  wherein said pressuring in Step (9) and cooling in Step (11) produce a liquid phase in said Seventh Stream comprising hydrocarbon compounds having 5 or more carbon atoms;
(12) transporting said Seventh Stream from said First Cooling Zone through a Seventh Stream Zone and to a Third Separating Zone;
(13) separating, in said Third Separating Zone, said Seventh Stream into an Eighth Stream and a Ninth Stream;
  wherein said Eighth Stream comprises a major part of said liquid phase of said Seventh Stream;
  wherein said Ninth Stream comprises a major part of a vapor phase separated from said Seventh Stream;
(14) transporting said Eighth Stream from said Third Separating Zone through an Eighth Stream Zone and to a Second Collecting Zone;
(15) transporting said Ninth Stream from said Third Separating Zone through a Ninth Stream Zone and to a Second Pressurizing Zone;
(16) pressurizing, in said Second Pressurizing Zone, said Ninth Stream to produce a Tenth Stream;
(17) transporting said Tenth Stream from said Second Pressurizing Zone through a Tenth Stream Zone and to an Eleventh Stream Zone;
(18) combining, in said Eleventh Stream Zone, said Second Stream and said Tenth Stream to produce an Eleventh Stream;
(19) transporting said Eleventh Stream though said Eleventh Stream Zone and to a Second Cooling Zone;
(20) cooling, in said Second Cooling Zone, said Eleventh Stream to produce a Twelfth Stream;
  wherein said pressuring in Step (16) and cooling in Step (20) produce a liquid phase in said Twelfth Stream comprising hydrocarbon compounds having 5 or more carbon atoms;
(21) transporting said Twelfth Stream from said Second Cooling Zone through a Twelfth Stream Zone and to a Fourth Separating Zone;
(22) separating, in said Fourth Separating Zone, said Twelfth Stream into a Thirteenth Stream and a Fourteenth Stream;
  wherein said Thirteenth Stream comprises a major part of said liquid phase of said Twelfth Stream;
  wherein said Fourteenth Stream comprises a major part of a vapor phase separated from said Twelfth Stream;
(23) transporting said Fourteenth Stream from said Fourth Separating Zone through a Fourteenth Stream Zone and to a Third Cooling Zone;
(24) transporting said Thirteenth Stream from said Fourth Separating Zone through a Thirteenth Stream Zone and to a Third Collecting Zone;
(25) cooling, in said Third Cooling Zone, said Fourteenth Stream to produce a Fifteenth Stream comprising a vapor phase;
(26) transporting said Fifteenth Stream from said Third Cooling Zone through a Fifteenth Stream Zone and to a Fifth Separating Zone;
(27) separating, in said Fifth Separating Zone, said Fifteenth Stream into a Sixteenth Stream and a Seventeenth Stream;
  wherein said Sixteenth Stream comprises a major part of said liquid phase of said Fifteenth Stream;
  wherein said Seventeenth Stream comprises a major part of said vapor phase of said Fifteenth Stream;
(28) transporting said Seventeenth Stream from said Fifth Separating Zone through a Seventeenth Stream Zone and to a Fifth Collecting Zone; and
(29) transporting said Sixteenth Stream from said Fifth Separating Zone through a Sixteenth Stream Zone and to a Fourth Collecting Zone.

9. A process according to claim 8 wherein said Second Stream Zone further comprises a First Filter Zone.

10. A process according to claim 8 wherein said Second Stream Zone further comprises an Oxygen Removal Zone.

11. A process according to claim 8 wherein said Fourth Stream Zone further comprises a Second Filter Zone.

12. A process according to claim 8 wherein said Tenth Stream Zone further comprises an Oxygen Removal Zone.

13. A process according to claim 8 wherein said Eleventh Stream Zone further comprises an Oxygen Removal Zone.

14. A process according to claim 8 wherein said other compounds are selected from the group consisting of ethylene, hydrocarbon compounds that have one to four carbon atoms excluding ethylene and isobutane, isobutane, hydrocarbon atoms that have five or more carbon atoms excluding 1-hexene, 1-hexene, and nonhydrocarbon compounds with a molecular weight less than 60 grams per mole.

15. A process according to claim 8 to prepare a diluent for recycle consisting essentially of Steps (1)–(29).

16. A process according to claim 8 wherein said diluent is isobutane.

17. A process according to claim 16 wherein said other compounds of said First Stream comprises ethylene and 1-hexene, wherein said vapor of said Seventeenth Stream comprises said ethylene and wherein said liquid of said Thirteenth stream comprises said 1-hexene.

18. A process according to claim 17 wherein said liquid of said Sixteenth Stream comprises said isobutane diluent.

19. A process according to claim 18 comprising in addition subjecting at least one of said Second Stream, said Tenth Stream or said Eleventh Stream to an oxygen removal step.

* * * * *